US012350799B1

(12) United States Patent
Grimmett

(10) Patent No.: US 12,350,799 B1
(45) Date of Patent: Jul. 8, 2025

(54) TOOL FOR COUNTERSINKING STAPLES AND METHODS OF USE

(71) Applicant: Adam Grimmett, Eastport, NY (US)

(72) Inventor: Adam Grimmett, Eastport, NY (US)

( * ) Notice: Subject to any disclaimer, the term of this patent is extended or adjusted under 35 U.S.C. 154(b) by 0 days.

(21) Appl. No.: 19/183,461

(22) Filed: Apr. 18, 2025

(51) Int. Cl.
*B25C 5/11* (2006.01)
*B25C 5/06* (2006.01)

(52) U.S. Cl.
CPC .................. *B25C 5/11* (2013.01); *B25C 5/06* (2013.01)

(58) Field of Classification Search
CPC .... B25C 5/11; B25C 5/06; B25C 1/02; B25C 3/006; B25C 11/00; B25C 5/13; B25C 5/1637; B25C 5/00; B25C 5/02; B25C 7/00; A61B 17/0642; A61B 17/10; A61B 17/92; A61B 17/064; A61B 17/068; A61B 17/0682; A61B 17/07207
See application file for complete search history.

(56) References Cited

U.S. PATENT DOCUMENTS 1,158,430 A 11/1915 Bell
3,036,482 A 5/1962 Kenworthy
3,323,568 A 6/1967 Schmidt
3,979,040 A 9/1976 Denin
4,120,438 A 10/1978 Litch
6,951,153 B2 10/2005 Berthlaume
7,152,380 B2 12/2006 Pendrous et al.
2006/0213014 A1 9/2006 Manske
2013/0200129 A1 8/2013 Paddock
2018/0215024 A1 8/2018 Carlson
2022/0055194 A1* 2/2022 Reynolds .................. B25C 5/11
2022/0126434 A1 4/2022 Avalone
2022/0362915 A1 11/2022 Dumph

* cited by examiner

*Primary Examiner* — Veronica Martin
(74) *Attorney, Agent, or Firm* — Nath, Goldberg & Meyer; Joshua B. Goldberg

(57) ABSTRACT

A tool for countersinking staples includes a punch and an outer casing. A proximal end of the punch is configured for striking with a hammer and the distal end for striking and countersinking a staple. The punch includes a first pair of tapered surfaces starting proximally at first and second side surfaces on an elongated shaft and tapering laterally outward. A pair of abutment surfaces are formed on an inner surface of the casing beginning proximally and tapering laterally outward. The pair of abutment surfaces contact the first pair of tapered surfaces during an upward motion of the punch to prevent further upward motion of the punch relative to the casing. A cavity within the casing accepts the crown of a staple. The cavity is of predetermined length such that torque may be applied to twisted and misaligned staples prior to hammering into a workpiece such as hardwood flooring.

20 Claims, 7 Drawing Sheets

TOOL FOR COUNTERSINKING STAPLES AND METHODS OF USE

BACKGROUND OF THE INVENTION

Field of the Invention

The disclosure of the present patent application relates to tools, and particularly to a tool used for countersinking staples into a workpiece such as hardwood flooring.

Description of Related Art

Hardwood flooring installation often requires the use of staples to securely fasten flooring planks to the subfloor. To achieve a smooth and seamless finish, it is necessary to countersink these staples below the surface of the wood, preventing interference with sanding, finishing, or potential wear over time. Countersinking staple tools are commonly used for this purpose, some including a movable punch housed within an outer casing. The punch features a tip designed to engage the staple and a head that is struck with a hammer to drive the staple into the wood.

Existing countersinking staple tools often incorporate multiple moving parts such as springs, pins within guide channels, and the like, which can increase manufacturing costs, reduce tool reliability, and lead to premature wear or failure. A need exists for a simplified, cost-effective, and durable solution within the industry.

SUMMARY OF THE INVENTION

The present disclosure is directed to an improved countersinking staple tool with fewer components than are present in the currently available tools, thereby reducing manufacturing costs while enhancing reliability and longevity. The present tool design maintains the essential functionality of driving staples effectively while minimizing mechanical complexity, making it a desirable solution for both professional and DIY flooring installations, among other applications.

In an embodiment, the present disclosure provides a tool for countersinking staples including a punch within an outer casing. According to this embodiment, the punch includes a proximal end and a distal end. The proximal end is configured to be struck with a hammer, and the distal end includes a narrowed tip for striking and countersinking a staple. An elongated shaft connects the proximal end to the distal end. The punch further includes a first pair of tapered surfaces, the first pair of tapered surfaces starting proximally at respective first and second side surfaces on the elongated shaft and tapering laterally outward towards the distal end of the punch. A second pair of tapered surfaces are also included. The second pair of tapered surfaces start proximally at respective front and back surfaces on the elongated shaft and taper laterally inward towards the distal end of the punch and serve to transfer force from the punch to a staple being driven. The casing of the countersinking tool includes a proximal end, a distal end, and a central channel. The central channel is configured to encase the punch slidingly therein. A pair of abutment surfaces are formed on an inner surface of the casing, beginning proximally and tapering laterally outward toward the distal end of the casing. The pair of abutment surfaces are configured to contact the first pair of tapered surfaces on the punch during an upward motion of the punch to thereby prevent further upward motion of the punch in relation to the casing.

In certain embodiments, the casing of the countersinking tool may be formed of a single unitary piece or of two separate halves joined together. The casing may include a pair of outer tapered surfaces starting proximally on an outer surface of the casing and extending laterally outward in the distal direction.

The elongate shaft of the punch may be rectangular in cross section, and the proximal end of the punch may include a circular head with a rounded upper surface and flat lower surface. The punch may include a length L1 which is a distance from the flat lower surface to the tip of the tip of the punch where L1 is greater than a length L2 of the casing. The lengths L1 and L2 may be predetermined such that when the punch is struck with a hammer the tip of the punch protrudes from the casing by a distance L3 in which L3=L1-L2. The flat lower surface of the circular head may provide a stopping surface which contacts an upper surface of the casing to prevent downward motion of the punch relative to the casing.

The countersinking tool may include a length LA equaling a distance from a proximal starting point of the abutment surfaces to a distal endpoint of the casing and a length L5 equaling a distance from a proximal starting point of the first tapered surfaces to the tip of the punch, and a length L6 equaling L4-L5. L6 is a length of a cavity within the casing for receiving a head of a staple. The countersinking tool may be of predetermined size to receive a staple having a length L7, in which the length L6 of the cavity is at least about 20%, at least 20%, about 20%, or 20% of L7.

Further provided by the present disclosure is a method of countersinking a staple. The method includes providing a countersinking tool comprising a punch slidingly enclosed within a casing. The punch is moved to an upper position within the casing such that a first pair of tapered surfaces formed on the punch contact a pair of tapered abutment surfaces formed on an inner surface within the casing. A crown of a staple is inserted into a cavity formed in a distal end of the casing. A workpiece, such as hardwood flooring, wallboards, roofing, electrical wiring, crown molding, or any other workpiece is then contacted by the staple. Alternatively, the staple is already in contact with a workpiece and is protruding out from the workpiece and in need of countersinking. The crown of the staple is contacted, i.e., struck with a striking tip at the end of the punch while the first pair of tapered surfaces are in contact with the pair of tapered abutment surfaces. A proximal end of the punch is repeatedly hammered to thereby drive the staple into a surface of the workpiece. In certain embodiments, the staple may be driven below, partially below, or entirely below the surface of the workpiece. The length of the cavity may be predetermined to be at least about 20%, at least 20%, about 20%, or 20% of the length of the staple.

In some embodiments, the staple may be a misaligned staple which is twisted along its length. Prior to hammering the punch, and while the crown of the staple inserted in the cavity of the countersinking tool, the countersinking tool is twisted with the misaligned staple therein such that the staple is straightened along its length.

The present disclosure additionally relates to a kit comprising a tool for countersinking staples including a punch within an outer casing and at least one staple. According to this embodiment, the punch includes a proximal end and a distal end. The proximal end is configured to be struck with a hammer, and the distal end includes a narrowed tip for striking and countersinking a staple. An elongated shaft connects the proximal end to the distal end. The punch further includes a first pair of tapered surfaces, the first pair of tapered surfaces starting proximally at respective first and second side surfaces on the elongated shaft and tapering laterally outward towards the distal end of the punch. A second pair of tapered surfaces are also included. The second pair of tapered surfaces start proximally at respective front and back surfaces on the elongated shaft and taper laterally inward towards the distal end of the punch and serve to transfer force from the punch to a staple being driven. The casing of the countersinking tool includes a proximal end, a distal end, and a central channel. The central channel is configured to encase the punch slidingly therein. A pair of abutment surfaces are formed on an inner surface of the casing, beginning proximally and tapering laterally outward toward the distal end of the casing. The pair of abutment surfaces are configured to contact the first pair of tapered surfaces on the punch during an upward motion of the punch to thereby prevent further upward motion of the punch in relation to the casing.

In certain embodiments, the kit can comprise a plurality of staples. In other embodiments, the at least one staple is configured to fit within a cavity formed within a distal end of the casing. The at least one staple may have a length L7 and the cavity may have a length L6, wherein length L6 is at least about 20% of L7. Furthermore, the cavity may include a width W1 and depth D1, and the staple may be of a width W2 and a gauge G, wherein W1 is between 1-20% larger than W2, and D1 is between 1-20% larger than G.

These and other features of the present subject matter will become readily apparent upon further review of the following specification.

BRIEF DESCRIPTION OF DRAWINGS

FIG. 5E is an environmental perspective view of staples after being driven into a hardwood flooring workpiece using a countersinking tool.

Similar reference characters denote corresponding features consistently throughout the attached drawings.

DETAILED DESCRIPTION

Definitions

Figure 1B:
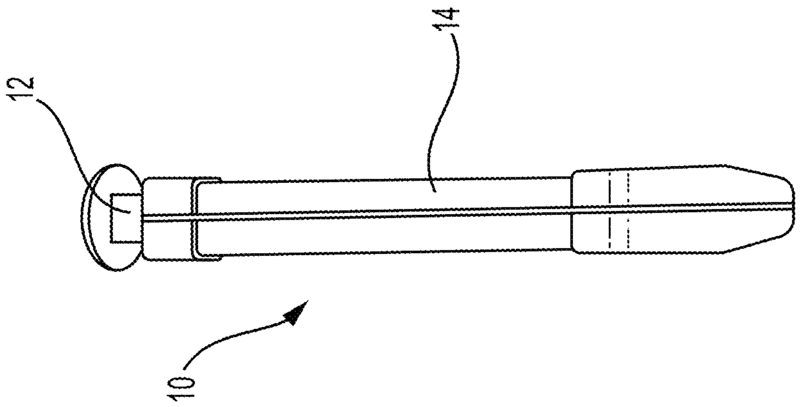
FIG. 1B is a side view of a tool for countersinking staples.
Figure 1A:
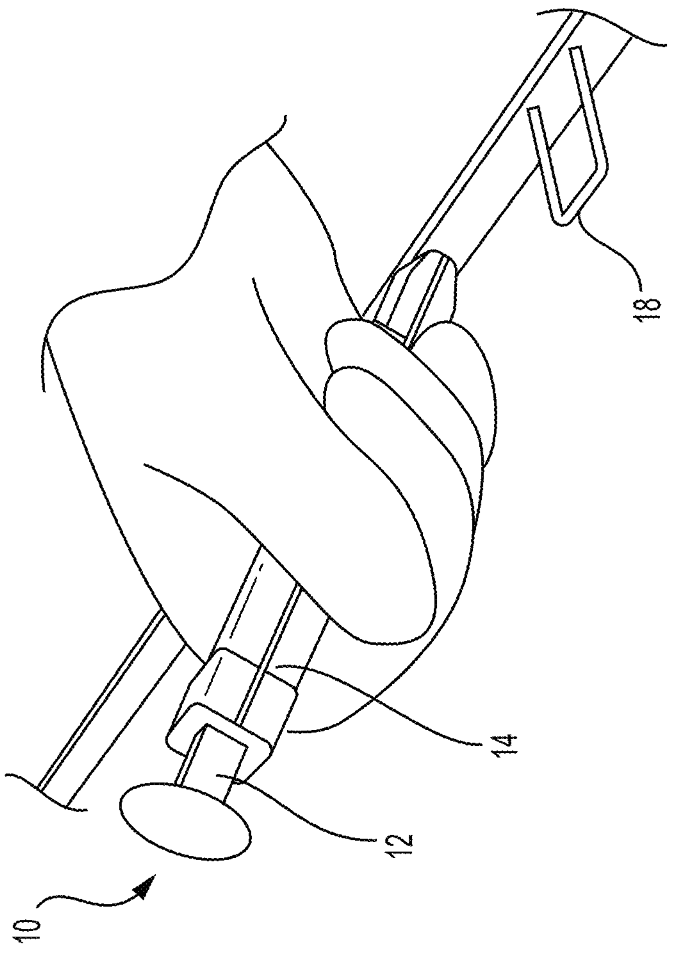
FIG. 1A is an environmental perspective view of a tool for countersinking staples into a workpiece.
Figure 2B:
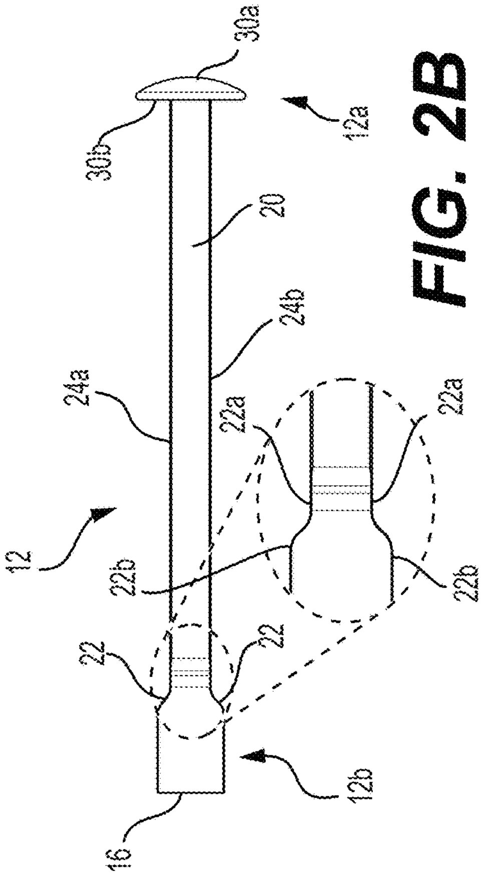
FIG. 2B is a front view of a punch used in a tool for countersinking staples.
Figure 2C:
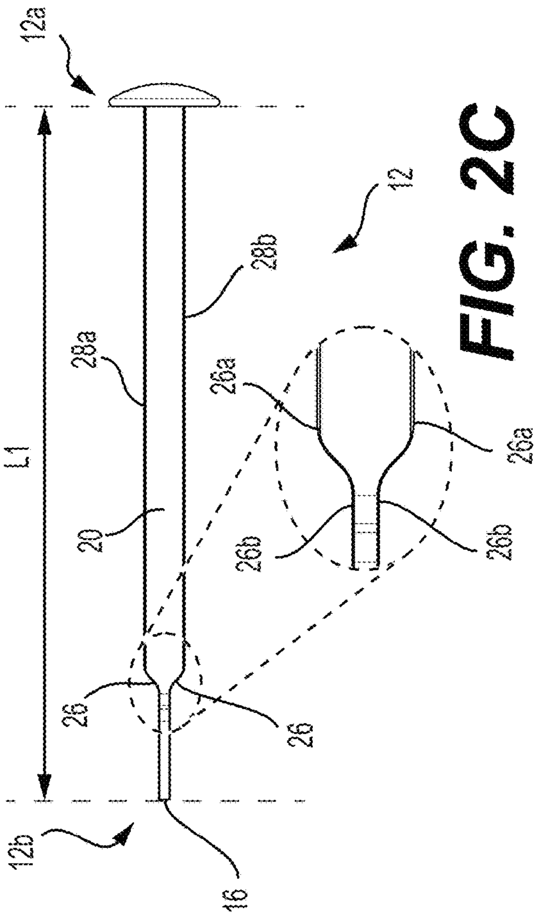
FIG. 2C is a side view of a punch used in a tool for countersinking.
Figure 2A:
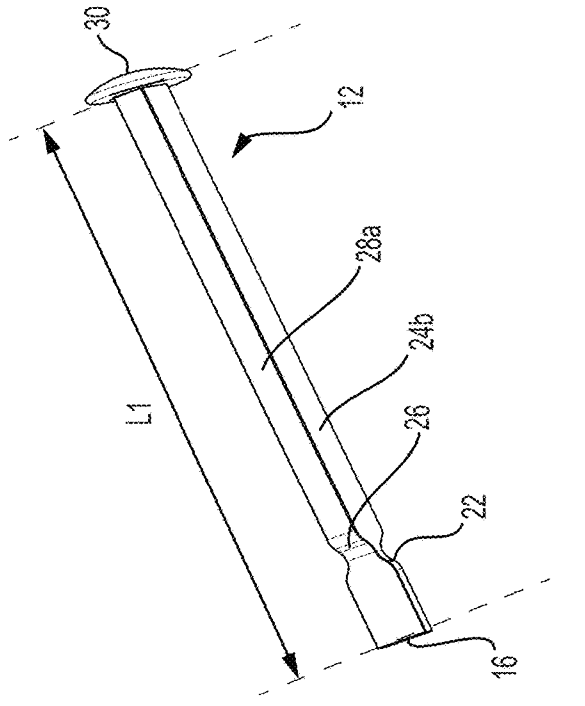
FIG. 2A is a perspective view of a punch used in a tool for countersinking staples.
Figure 3B:
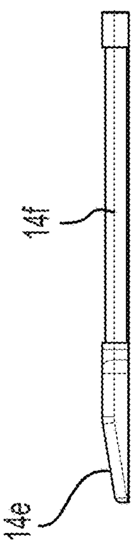
FIG. 3B is a side view one half of a casing.
Figure 3C:
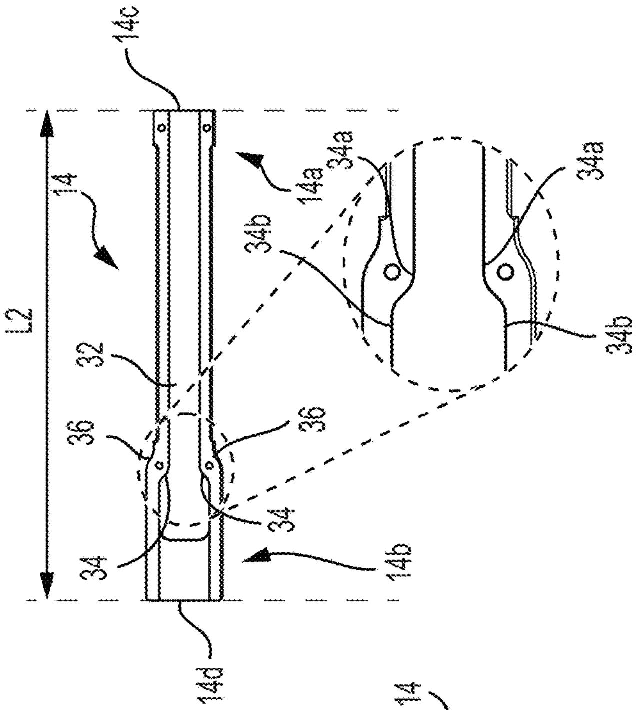
FIG. 3C is a front cutaway view of a casing
Figure 3A:
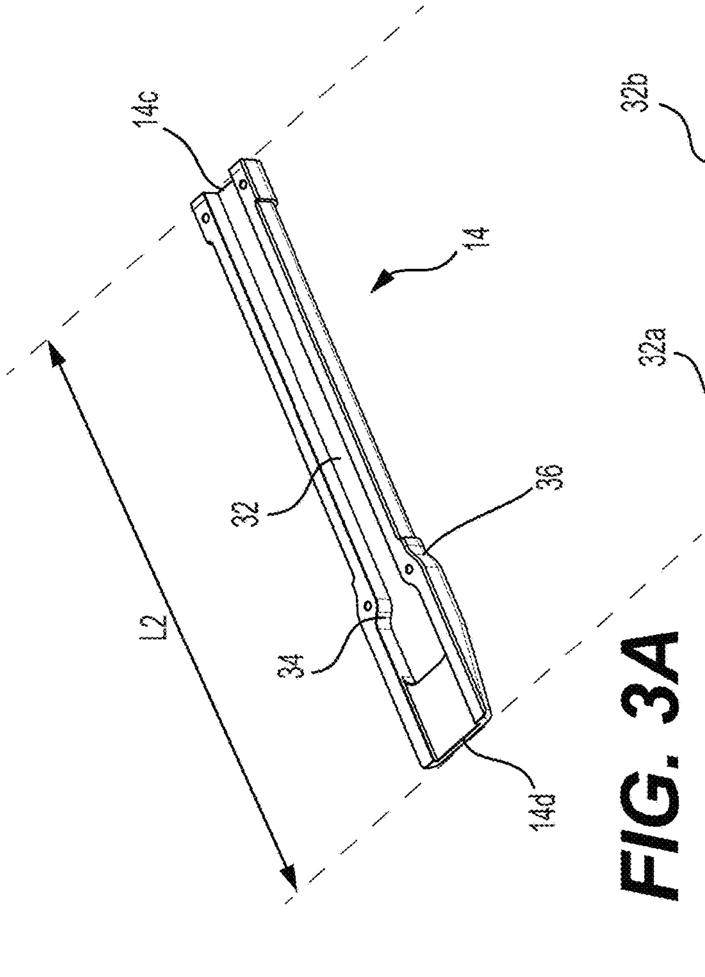
FIG. 3A is a perspective cutaway view of a casing used in a tool for countersinking staples.
Figure 3D:
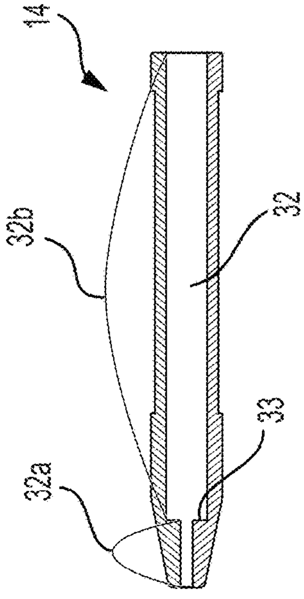
FIG. 3D is a side cutaway view of a casing.

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where devices are described as having, including, or comprising specific components, or where processes are described as having, including, or comprising specific process steps, it is contemplated that products of the present teachings can also consist essentially of, or consist of, the recited components, and that the processes of the present teachings can also consist essentially of, or consist of, the recited process steps.

It is noted that, as used in this specification and the appended claims, the singular forms “a”, “an”, and “the” include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms “include,” “includes”, “including,” “have,” “has,” or “having” should be generally understood as open-ended and non-limiting unless specifically stated otherwise.

The use of the singular herein includes the plural (and vice versa) unless specifically stated otherwise. In addition, where the use of the term “about” is before a quantitative value, the present teachings also include the specific quantitative value itself, unless specifically stated otherwise. As used herein, the term “about” refers to a ±10% variation from the nominal value unless otherwise indicated or inferred.

The term “optional” or “optionally” means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

With reference to FIGS. 1A-B and FIGS. 2A-C, a tool 10 for countersinking staples is shown including a punch 12 within an outer casing 14. The punch 10 includes a proximal end 12*a* and a distal end 12*b*. The proximal end 12*a* is configured to be struck with a hammer and the distal end 12*b* includes a narrowed tip 16 for striking and countersinking a staple 18. An elongated shaft 20 of punch 12 connects the proximal end 12*a* to the distal end 12*b*. The punch 12 further includes a first pair of tapered surfaces 22, the first pair of tapered surfaces 22 starting proximally at respective first and second side surfaces 24*a*, 24*b* on the elongated shaft 20 and tapering laterally outward towards the distal end 12*b* of the punch 12. The first tapered surfaces have a narrow proximal end 22*a* beginning on side surfaces 24*a*, 24*b* and taper laterally outward to a wide distal end 22*b*.

A second pair of tapered surfaces 26 are also included. The second pair of tapered surfaces 26 start proximally at respective front and back surfaces 28*a*, 28*b* on the elongated shaft and taper laterally inward towards the distal end 12*b* of the punch. The second pair of tapered surfaces 26 include a wide proximal end 26*a* tapering laterally inward to a narrow distal end 26*b*. The second pair of tapered surfaces 26 serve to transfer a concentrated striking force of the punch 12 to the tip 16 and a staple being struck. The elongate shaft 20 of the punch 12 may be rectangular or square in cross section, and the proximal end 12*a* of the punch may include a circular head 30 with a rounded upper surface 30*a* and flat lower surface 30*b*. The punch may include a length L1 which is a distance from the flat lower surface 30*b* to the tip 16 of the punch.

Referring now to FIGS. 3A-D, the casing 14 of the countersinking tool includes a proximal end 14*a* and a distal end 14*b* and a central channel 32. The central channel 32 is configured to encase the punch slidingly therein. A pair of abutment surfaces 34 are formed on an inner surface of the casing, beginning proximally and tapering laterally outward toward the distal end 14*b* of the casing. The abutment surfaces 34 include a narrow proximal starting point 34*a* and taper laterally outward to a wide distal endpoint 34*b*. The pair of abutment surfaces 34 are configured to contact the first pair of tapered surfaces 22 on the punch 12 during an upward motion of the punch 12 to thereby prevent further upward motion of the punch 12 in relation to the casing 14. The casing 14 may include a length L2 from a proximal upper surface 14*c* to a distal bottom surface 14*d*.

The casing 14 of the countersinking tool may be formed of a single unitary piece or of two separate halves joined together by fasteners, as non-limiting embodiments. The casing may include a pair of outer tapered surfaces 36 starting proximally on an outer surface of the casing and extending laterally outward in the distal direction. The casing 14 may include a laterally inward taper 14*e* at its distal end 14*b* and may include chamfered corners 14*f* along its length. The inner channel 32 of the casing includes a narrow section 32*a* in which the narrowed tip of the punch moves axially, and a wide section 32*b* in which the elongated shaft of the punch moves axially. A lip 33 is formed on the interior of the casing and delineates the narrow section 32*a* from the wide section 32*b*.

Figure 4A:
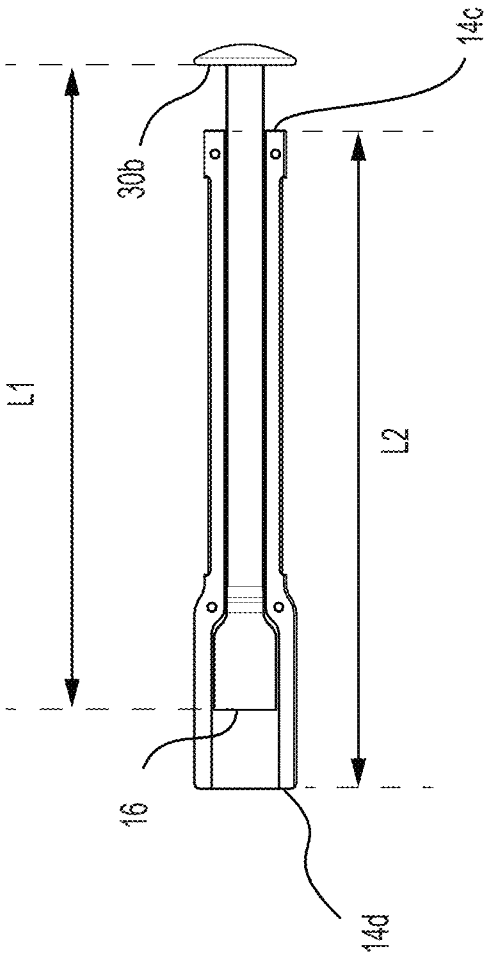
FIG. 4A is a front cutaway view of a casing with a punch therein placed in an uppermost position.
Figure 4B:
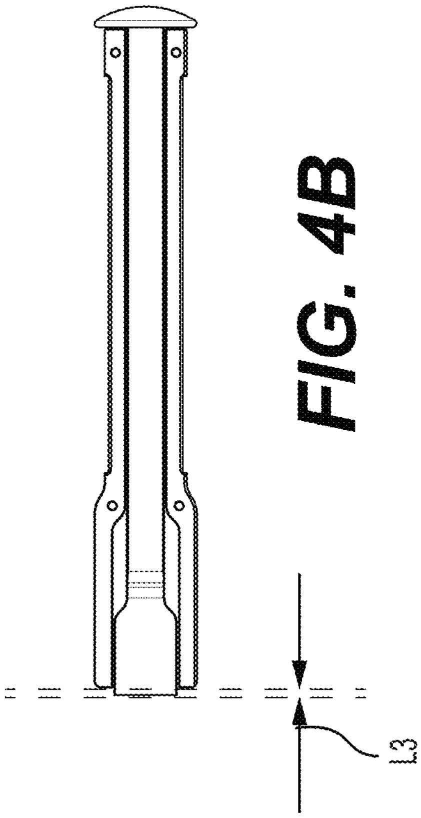
FIG. 4B is a front cutaway view of a casing with a punch therein placed in a downmost position.
Figure 4C:
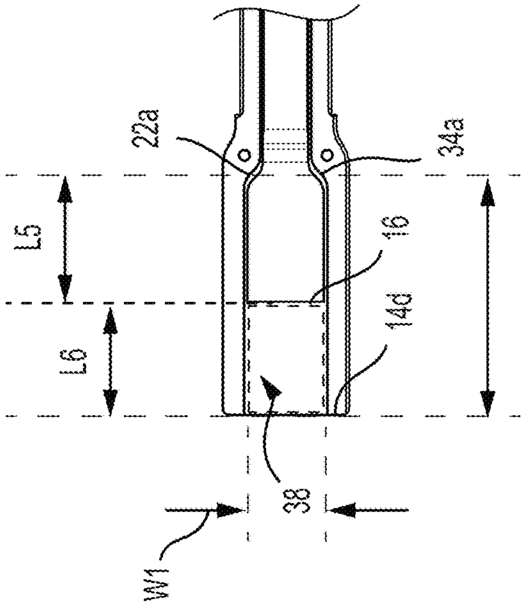
FIG. 4C is a front close-up view of a cavity within a countersinking tool for receiving the head of a staple.

Referring to FIGS. 4A-F, length L1 of the punch, as shown, may be greater than length L2 of the casing. The lengths L1 and L2 may be predetermined such that when the punch is struck with a hammer, the tip of the punch protrudes from the casing by a distance L3, in which L3=L1-L2. The flat lower surface 30*b* of the circular head 30 of punch 12 (FIG. 4A) provides a stopping surface which contacts an upper surface 14*c* of the casing to prevent further downward motion of the punch relative to the casing (FIG. 4B). Advantageously, the tool prevents damage to work surfaces such as hardwood flooring by ensuring that a staple is not driven further than intended, i.e. no further than distance L3.

Figure 4D:
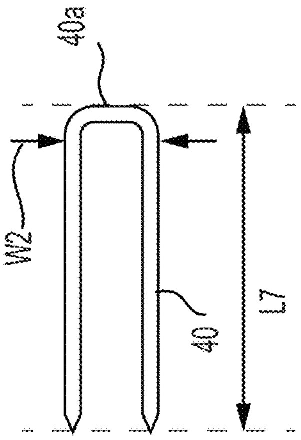
FIG. 4D is a front view of a staple.
Figure 4E:
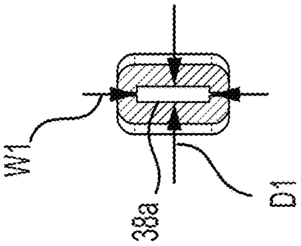
FIG. 4E is a bottom view of a countersinking tool.

The countersinking tool may include a length LA equaling a distance from the proximal starting point 34*a* of the abutment surfaces to the distal bottom surface 14*d* of the casing and a length L5 equaling a distance from a proximal starting point 22*a* of the first tapered surfaces 22 to the tip 16 of the punch, and a length L6 equaling L4-L5 (starting points 22*a* and 34*a* are at approximately the same location along the length of the tool). L6 is a length of a cavity 38 within the casing for receiving a head 40*a* of a staple 40 (FIG. 4D). The staple 40 may have a length L7 and length L6 of cavity 38 may be a predetermined size of at least about 20%, at least 20%, about 20%, or 20% of length L7 of staple 40.

Figure 4F:
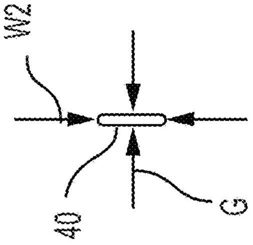
FIG. 4F is a top view of a staple.

Advantageously, the countersinking tool is designed in such a way as to allow a user to apply torque to a misfired staple, without resulting in damage to small or breakable parts, which are omitted from the tool. The cavity 38 includes a bottom opening 38*a* and a depth D1 (FIG. 4E) which is of predetermined size to be just larger than a gauge G of staple 40 (FIG. 4F). In some embodiments, depth D1 may be about 1-20% larger, about 1-10% larger, or about 1-5% larger than gauge G. In addition, the width W1 of cavity 38 may be about 1-20% larger, about 1-10% larger, or about 1-5% larger than width W2 of staple 40. The close sizing between depth D1 and gauge G, as well as width W1 to width W2 is predetermined such that the tool may be used to effectively apply torque to the staple in cases where the staple has been misfired into a workpiece. Although primarily intended for use on staples, the countersinking tool may also function similarly on other types of fasteners, including cleats, which are similarly of predetermined length, width and gauge.

With reference now to FIGS. 5A-E, as well as the previous FIGS. 1A-4D, the present disclosure further provides a method of countersinking staples 40, 42. The method includes providing a countersinking tool 10 including a punch 12 slidingly enclosed within a casing 14 (see FIGS. 1A-B, FIG. 5A). The punch 12 is moved to an upper position within the casing such that a first pair of tapered surfaces 22 formed on the punch 12 contact a pair of tapered abutment surfaces 34 formed on an inner surface within the casing 14 (See FIG. 4A). A crown 40*a* of a staple is inserted into a cavity 38 formed in a distal end 12*b* of the casing 14 (See FIGS. 4C, 4D). The staple is in contact with a workpiece W (See FIGS. 5A-E). The crown of the staple 40*a* is in contact with a tip 16 of punch 12 while the first pair of tapered surfaces 22 are in contact with the pair of tapered abutment surfaces 34 (See FIGS. 4A, 4C, 5D). A proximal end 14*a* of the punch 14 is repeatedly hammered (See FIG. 5D) to thereby drive the staple 40 below a surface of the workpiece (See FIG. 5E). The length of the cavity 38 may predetermined to be at least about 20% of the length L7 of the staple 40 (See FIGS. 4C, 4D), and the workpiece may be hardwood flooring (See FIGS. 1A-B, 5A-E).

Figure 5A:
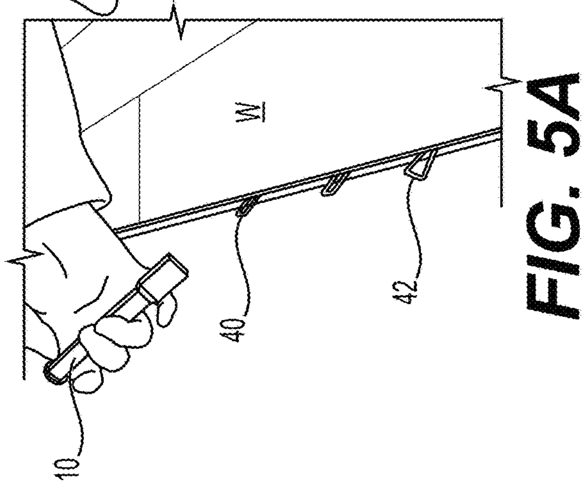
FIG. 5A is an environmental perspective view of a countersinking tool for staples used in hardwood flooring.
Figure 5B:
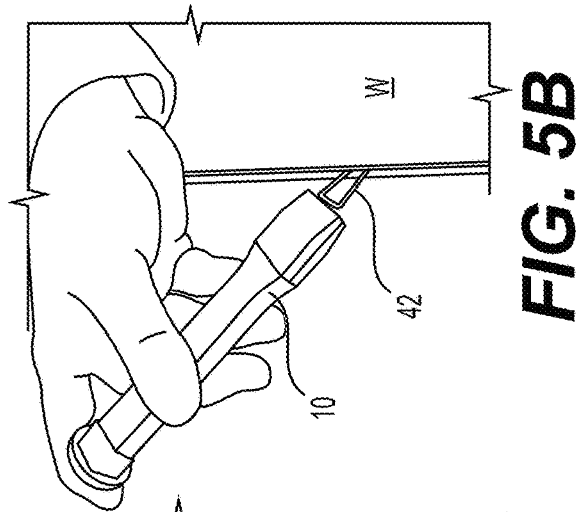
FIG. 5B is an environmental perspective view of a countersinking tool prior to being placed on a misaligned staple.
Figure 5C:
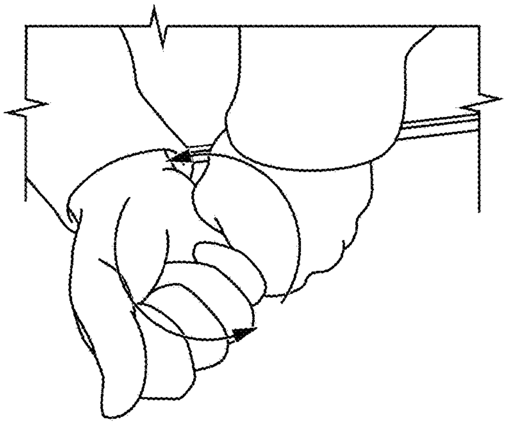
FIG. 5C is an environmental perspective view of a countersinking tool being used to apply torque to a misaligned staple.
Figure 5D:
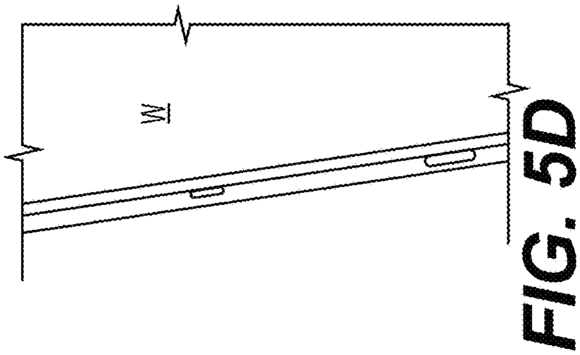
FIG. 5D is an environmental perspective view of a countersinking tool being used to drive staples into a workpiece.
Figure 5D:
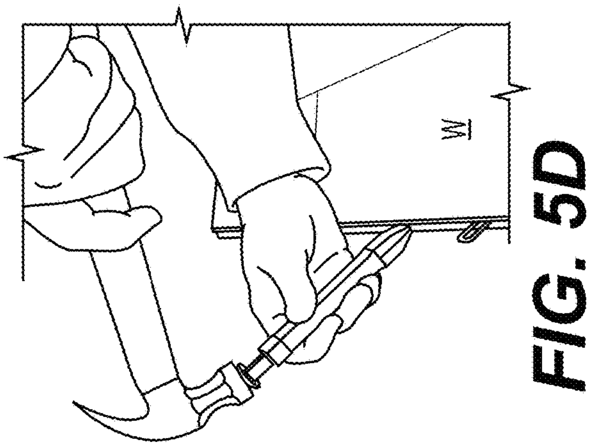

In some embodiments, the staple may be a misaligned staple 42 (See FIGS. 5A-B) which is twisted along its length. Prior to hammering the punch, and while the crown of the staple inserted in the cavity of the countersinking tool, the countersinking tool is twisted with the misaligned staple therein such that the staple is straightened along its length (See FIGS. 5B, 5C). Once the misaligned staple 42 has been straightened, it may be hammered into the workpiece W, as previously described, until the crown of the staple rests below the surface of the workpiece W (FIGS. 5D, 5E).

Figure 6A:
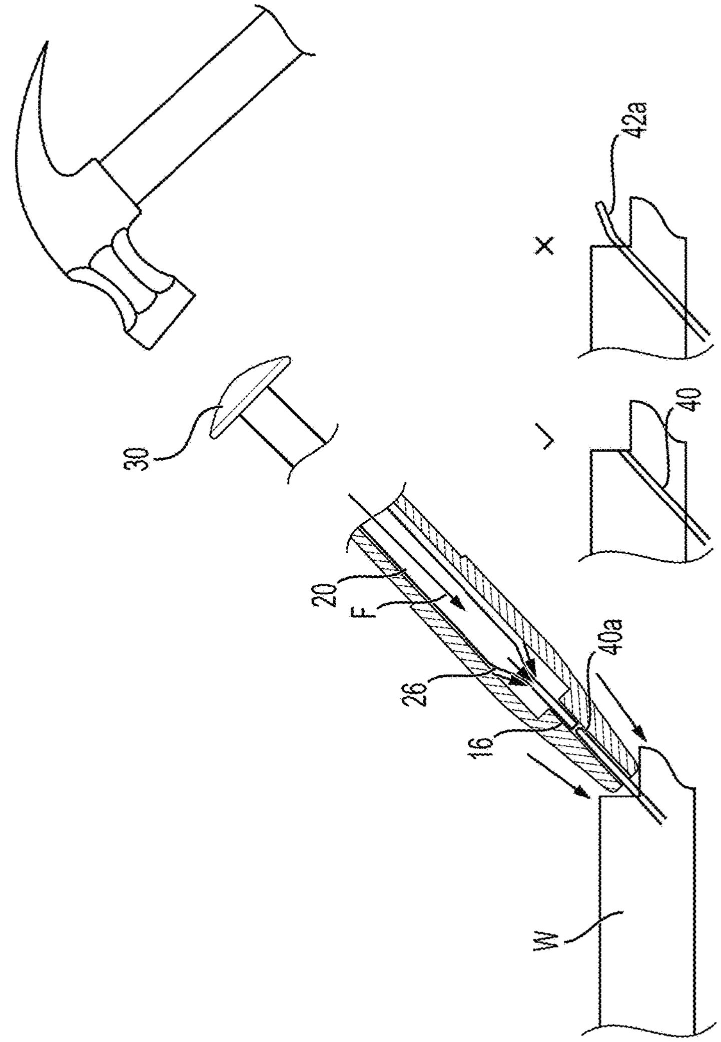
FIG. 6A is a side partial cutaway environmental view of a countersinking tool in use driving a staple.
Figure 6B:
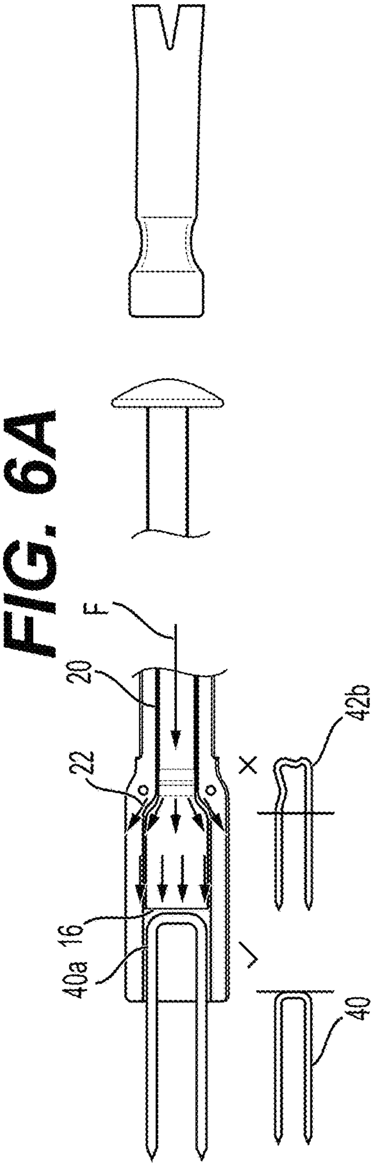
FIG. 6B is a front partial cutaway environmental view of a countersinking tool in use driving a staple.

Turning to FIGS. 6A-B, an additional advantage in the design of the present countersinking tool is the ability to achieve properly and consistently countersunk staples, without buckling or bending in the staple. This is achieved by the close spacing between the casing, punch and the staple when the staple is inserted into the tool, as well as the even transfer of forces from the elongated shaft to the striking tip through the first and second tapered surfaces and onto the crown of a staple. The staple is prevented from buckling and bending by the even transfer of forces onto the staple crown, as well as the enclosure of the staple within the casing of the tool. Such consistent countersinking of the staples is only achievable using the present streamlined device, only having a minimal number of parts each having sufficient strength to withstand the force required to countersink the staple without any bending or buckling in either the staple or any component of the present device. As shown in FIGS. 6A-B, a force F is transferred when the tool is struck by a hammer from the elongated shaft 20 through the first tapered surfaces 22 and second tapered surfaces 26, through tip 16 onto a crown 40*a* of a staple. During prototyping and experimenting of the tool, the design has proven to consistently deliver properly countersunk staples 40, while preventing occurrences of bent staples 42*a* and buckled staples 42*b*.

It is to be understood that the tool for countersinking staples and methods of use thereof are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A tool for countersinking staples comprising:

a punch, the punch comprising:

a proximal end and a distal end, wherein the proximal end is configured to be struck with a hammer and the distal end includes a tip configured for striking a staple;

an elongated shaft connecting the proximal end to the distal end;

a first pair of tapered surfaces, the first pair of tapered surfaces starting proximally at respective first and second side surfaces on the elongated shaft and tapering laterally outward towards the distal end; and a second pair of tapered surfaces, the second pair of tapered surfaces starting proximally at respective front and back surfaces on the elongated shaft and tapering laterally inward towards the distal end; and a casing, the casing comprising:

a proximal end and a distal end;

a central channel, wherein the central channel is configured to encase the punch slidingly therein; and a pair of abutment surfaces formed on an inner surface of the casing, the pair of abutment surfaces beginning proximally and tapering laterally outward toward the distal end, wherein the pair of abutment surfaces are configured to contact the first pair of tapered surfaces during an upward motion of the punch to prevent further upward motion of the punch relative to the casing.

2. The tool for countersinking staples of claim 1, wherein the casing is a unitary piece.

3. The tool for countersinking staples of claim 1, wherein the casing comprises two separate halves joined together.

4. The tool for countersinking staples of claim 1, wherein the elongated shaft is rectangular in cross section.

5. The tool for countersinking staples of claim 1, wherein the casing includes a pair of outer tapered surfaces starting proximally on an outer surface of the casing and extending laterally outward in the distal direction.

6. The tool for countersinking stapes of claim 1, wherein the proximal end of the punch includes a circular head with a rounded upper surface and a flat lower surface.

7. The tool for countersinking staples of claim 6, wherein a length of the punch L1 is a distance from the flat lower surface to a tip of the punch, and wherein L1 is greater than a length L2 of the casing, and wherein the lengths L1 and L2 are predetermined such that when the punch is struck with a hammer the tip of the punch protrudes from the casing by a distance L3 wherein L3=L1−L2.

8. The tool for countersinking staples of claim 7, wherein the flat lower surface provides a stopping surface which, when in contact with an upper surface of the casing, prevents downward motion of the punch relative to the casing.

9. The tool for countersinking staples of claim 1, wherein a length L4 equals a distance from a proximal starting point of the abutment surfaces to a distal end surface of the casing, a length L5 equals a distance from a proximal starting point of the first tapered surfaces to the tip of the punch, and a length L6=L4−L5, wherein L6 is a length of a cavity within the casing for receiving a head of a staple.

10. The tool for countersinking staples of claim 9, further comprising a staple, wherein a length L7 is a length of the staple and wherein L6 is at least 20% of L7, and wherein the tool is configured to avoid bending or buckling the staple while countersinking the staple.

11. A method of countersinking a staple comprising:

providing a countersinking tool comprising a punch slidingly enclosed within a casing;

moving the punch to an upper position within the casing such that a first pair of tapered surfaces formed on the punch contact a pair of tapered abutment surfaces formed on an inner surface within the casing;

inserting a crown of a staple into a cavity formed in a distal end of the casing;

contacting a workpiece with the staple;

contacting the crown of the staple with a striking tip at a distal end of the punch while the first pair of tapered surfaces are in contact with the pair of tapered abutment surfaces; and repeatedly hammering a proximal end of the punch to thereby drive the staple below a surface of the workpiece without bending or buckling the staple.

12. The method of countersinking a staple according to claim 11, wherein a length of the cavity is at least about 20% of a length of the staple.

13. The method of countersinking a staple according to claim 11, wherein the staple is a misaligned staple which is twisted along its length.

14. The method of countersinking a staple according to claim 13, further comprising, prior to hammering the punch, and while the crown of the staple is inserted in the cavity of the countersinking tool, twisting the countersinking tool with the misaligned staple therein such that the staple is straightened along its length.

15. The method of countersinking a staple according to claim 11, wherein the workpiece is hardwood flooring.

16. A kit comprising:

a tool for countersinking staples comprising:

a punch, the punch comprising:

a proximal end and a distal end, wherein the proximal end is configured to be struck with a hammer and the distal end includes a tip configured for striking a staple;

an elongated shaft connecting the proximal end to the distal end;

a first pair of tapered surfaces, the first pair of tapered surfaces starting proximally at respective first and second side surfaces on the elongated shaft and tapering laterally outward towards the distal end; and a second pair of tapered surfaces, the second pair of tapered surfaces starting proximally at respective front and back surfaces on the elongated shaft and tapering laterally inward towards the distal end; and a casing, the casing comprising:

a proximal end and a distal end;

a central channel, wherein the central channel is configured to encase the punch slidingly therein; and a pair of abutment surfaces formed on an inner surface of the casing, the pair of abutment surfaces beginning proximally and tapering laterally outward toward the distal end, wherein the pair of abutment surfaces are configured to contact the first pair of tapered surfaces during an upward motion of the punch to prevent further upward motion of the punch relative to the casing; and at least one staple.

17. The kit of claim 16 comprising a plurality of staples.

18. The kit of claim 16, wherein the at least one staple is configured to fit within a cavity formed within a distal end of the casing.

19. The kit of claim 16, wherein that at least one staple has a length L7 and wherein a length L6 of the cavity is at least about 20% of L7.

20. The kit of claim 19, wherein the cavity includes a width W1 and depth D1, and wherein the staple has a width W2 and a gauge G, wherein W1 is between 1-20% larger than W2 and D1 is between 1-20% larger than G.

* * * * *